United States Patent [19]

Brommer-Reuss

[11] Patent Number: 4,735,137
[45] Date of Patent: Apr. 5, 1988

[54] DEVICE FOR COMPRESSING WASTE MATERIALS

[75] Inventor: Wolfgang Brommer-Reuss, Osnobröck, Fed. Rep. of Germany

[73] Assignee: Ingenieurbüro H. Reuss, Osnabrück, Fed. Rep. of Germany

[21] Appl. No.: 24,900

[22] Filed: Mar. 11, 1987

[30] Foreign Application Priority Data

Mar. 18, 1986 [DE] Fed. Rep. of Germany ....... 3608996

[51] Int. Cl.$^4$ ............................................. B30D 5/00
[52] U.S. Cl. .................................... 100/244; 100/264
[58] Field of Search ........................ 100/232, 244, 264

[56] References Cited

U.S. PATENT DOCUMENTS

| 2,151,855 | 3/1939 | Kobold | 100/232 X |
| 2,393,130 | 1/1946 | Toulmin | 100/244 X |
| 3,070,003 | 12/1962 | Stacy | 100/244 X |
| 3,192,561 | 7/1965 | Archer et al. | 100/232 X |
| 3,811,813 | 5/1974 | Tacodne | 100/244 |
| 4,150,613 | 4/1979 | Smee et al. | 100/244 |
| 4,343,233 | 8/1982 | Burgin | 100/244 X |

FOREIGN PATENT DOCUMENTS 1959420 6/1970 Fed. Rep. of Germany .
3116287 9/1982 Fed. Rep. of Germany .
3608996 8/1986 Fed. Rep. of Germany .

Primary Examiner—Ronald Feldbaum
Attorney, Agent, or Firm—Michael J. Striker

[57] ABSTRACT

A device for compressing various solid waste materials comprises a matrix receiving waste material to be compressed by compressing hydraulic cylinders, and a bottom plate positioned below the matrix. The bottom plate has an opening for discharging a blank compressed in the matrix from the device. The matrix is formed of two half-shells, one of which is horizontally displaceable so as to close and open the opening in the bottom plate.

4 Claims, 1 Drawing Sheet

DEVICE FOR COMPRESSING WASTE MATERIALS

BACKGROUND OF THE INVENTION

The present invention relates to a device for compressing waste materials of all kinds.

Compressing devices or molds of the type under consideration comprise a matrix receiving waste materials, a bottom plate in which an opening for discharging a compressed blank from the matrix is provided, and compressing cylinders which are actuated hydraulically or pneumatically to compress solid waste materials in the matrix.

Waste materials to be processed in the device of the foregoing type may be wood, wooden shavings, wooden chips, pole timber, tree branches; organic wastes, such as grass, leaves, peanut shells, cacao shells, straw, cardboard, paper, books, textile materials, such as fabrics, leather, foil, unburnable waste such as metal chips, foils, bones, etc.

It has been known that in the devices of the type under discussion, the blank stamped from the waste material being processed must be removed from the compressing plane of the mold sleeve. It has been also known that in devices for compressing paper or paper-like materials, a stamped blank is removed from the pressing plane of the mold sleeve through an opening formed in the bottom plate whereby the pressor stamp serves also for pushing and discharging the blank from the pressing sleeve. Such a device has been disclosed in DE-OS No. 1, 59, 420.

It is obvious from the above that, due to the sealing process the cylinders which occupy the free space in the presseing sleeve must perform relatively large strokes for overlapping an idle path. Since the compressing cylinders have large diameters for obtaining large pressing forces this would require high outputs of hydraulic pumps for moving the compressing cylinders due to required cycles of the compressing process.

SUMMARY OF THE INVENTION

It is an object of the present invention to provide an improved device for compressing solid waste materials of all kinds.

It is another object of this invention to provide a device for compressing various waste materials, with which the overlapping of the vacant path by the pressing cylinders would not longer be necessary so that the power and drive outputs of hydraulic pumps due to reduced cylinder strokes would be kept low and the cross-sections of tubes and valves of the hydraulic equipment for the operation of the compressing cylinders would be maintained small.

These and other objects of the invention are attained by a device for compressing various solid waste materials, comprising a matrix receiving waste material to be compressed; an a bottom plate below said matrix, said bottom plate having an opening for discharging a blank compressed in said matrix from the device, said matrix being formed of two half-shells, one of which is horizontally displaceable so as to close and open said opening.

Due to positioning of the structural components of the compressing device as claimed, costs of such a device are considerably reduced.

The device is also very compact.

Said opening may be of rectangular or square cross-section.

A horizontal pressing plane is defined in said matrix, and a horizontal discharge plane for said blank is defined in the device, said discharge plane may extend below the pressing plane.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENT

Figure 1:
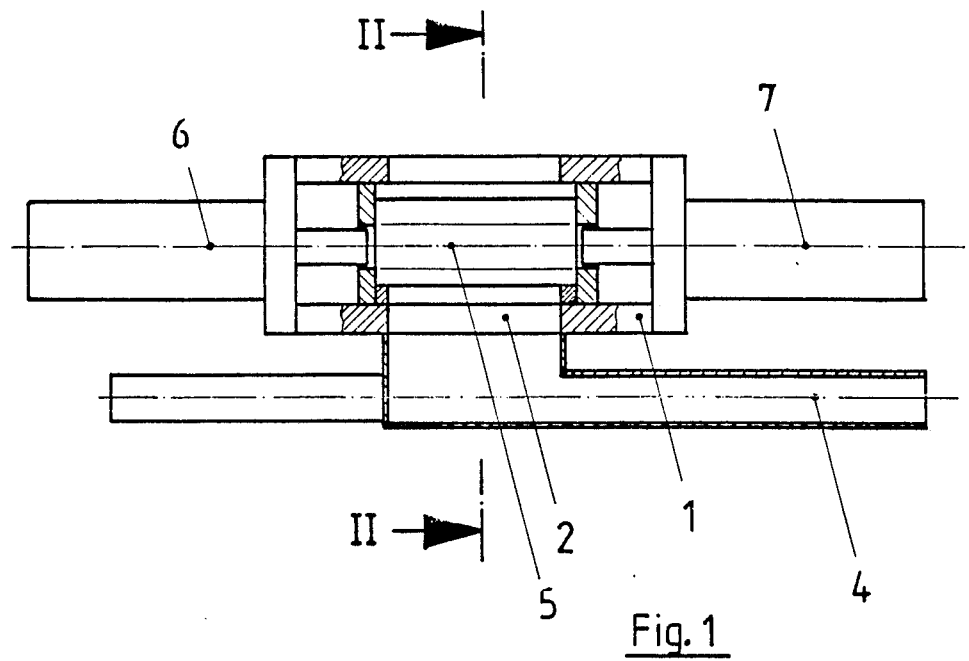
FIG. 1 is a schematic front view of the device for compressing solid waste materials of all kinds, according to the invention.
Figure 2:
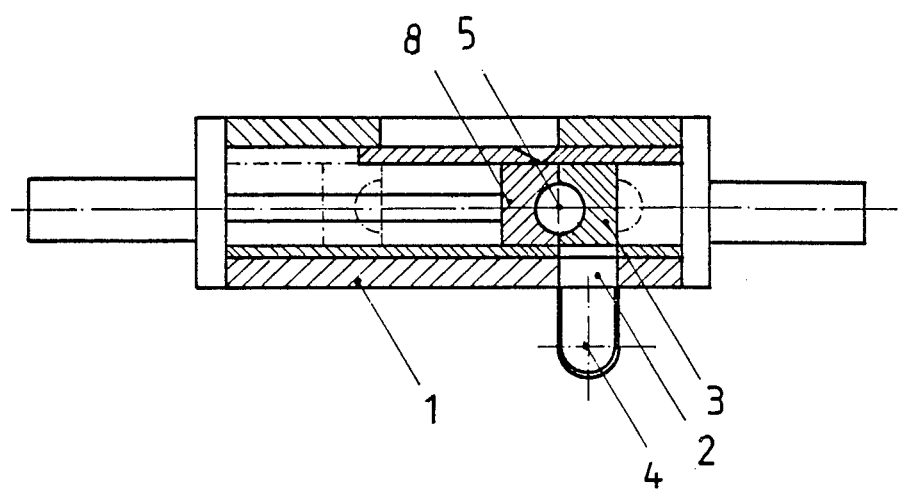
FIG. 2 is a sectional view taken along line II—II of FIG. 1.

Referring now to the drawings in detail, the device for compressing various solid waste materials includes a bottom plate 1 which has a rectangular or square opening 2, and a matrix which is formed of two half-shells 3 and 8. A horizontal ejection or discharge plane 4 for a blank of the waste material, compressed in the matrix is positioned below a pressing or molding horizontal plane 5. Plane 4 is defined in a channel for discharging the blank from the mold.

The half-shell 3 of the matrix of the mold of this invention is horizontally displaceable by any suitable conventional means and is positioned on the bottom plate 1. The half-shell 3 is displaced horizontally in two opposite directions so as to open or close the opening 2 in the bottom plate 1. Opening 2 represents a discharge opening for the blank which is compressed in the matrix 3, 8 in the mold or pressing plane 5 by means of two cylinders 6 and 7 and led to the discharge plane 4 from which the compressed blank of waste material is removed by any suitable conventional means, for example hydraulic means.

The waste material is received in the matrix 3, 8 and is compressed by compressing cylinders 6 and 7, the axes of which define the pressing plane 5 as shown in FIG. 1.

Compressing cylinders 6 and 7 can perform short cylinder strokes due to the structure of the matrix, and due to the provision of the opening 2 in the bottom plate 1, closable by the matrix shell 3, the compressing sleeve is no longer necessary, and the outputs of the pumps for moving cylinders 6 and 7 as well as cross-sections of pipes and valves and of drive pumps can be maintained low.

The opening for introducing solid waste materials into the matrix 3, 8 of the mold and all hydraulic or pneumatic structural components necessary for moving the compressing cylinders 6 and 7 and matrix half-shell 3 and also for the removal of the compressed blank from the mold are conventional and therefore are not described herein in detail.

It will be understood that each of the elements described above, or two or more together, may also find a useful application in other types of devices for compressing waste materials differing from the types described above.

While the invention has been illustrated and described as embodied in a device for compressing solid waste materials, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

I claim:

1. A device for compressing various solid waste materials, comprising a matrix receiving waste material to be compressed; and a bottom platebelow said matrix, said bottom plate having an opening for discharging a blank compressed in said matrix from the device, said matrix being formed of two half-shells, one of which is horizontally displaceable so as to close and open said opening.

2. The device as defined in claim 1, wherein said opening is of rectangular cross-section.

3. The device as defined in claim 1, wherein said opening has a square cross-section.

4. The device as defined in claim 1, wherein a horizontal pressing plane is defined in said matrix and a horizontal, discharge plane for said blank is defined in the device, said discharge plane extending below said pressing plane.

* * * * *